(12) United States Patent
Scherer et al.

(10) Patent No.: US 11,295,484 B2
(45) Date of Patent: Apr. 5, 2022

(54) METHOD FOR CARRYING OUT A SHADING CORRECTION AND OPTICAL OBSERVATION DEVICE SYSTEM

(71) Applicant: Carl Zeiss Meditec AG, Jena (DE)

(72) Inventors: Dominik Scherer, Aalen (DE);
Susanne Kohlhammer, Blaustein (DE);
Stefan Saur, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 128 days.

(21) Appl. No.: 16/584,015

(22) Filed: Sep. 26, 2019

(65) Prior Publication Data
US 2020/0098151 A1 Mar. 26, 2020

(30) Foreign Application Priority Data

Sep. 26, 2018 (DE) ...................... 10 2018 123 781.2

(51) Int. Cl.
*G06T 11/00* (2006.01)
*G06T 15/80* (2011.01)
(Continued)

(52) U.S. Cl.
CPC .............. *G06T 11/001* (2013.01); *G06T 7/90* (2017.01); *G06T 15/80* (2013.01); *G06T 19/20* (2013.01);
(Continued)

(58) Field of Classification Search
None
See application file for complete search history.

(56) References Cited

U.S. PATENT DOCUMENTS

2002/0008697 A1* 1/2002 Deering .................... G06T 5/20
345/418
2009/0268053 A1 10/2009 Wang et al.
(Continued)

FOREIGN PATENT DOCUMENTS

DE  102014107933 A1  12/2015
EP  2796916 A1  10/2014
WO  2017104271 A1  6/2017

OTHER PUBLICATIONS

Hirose Kazuyoshi, Takiguchi Yuu, Sugiyama Takahiro, Nomoto Yoshiro, Uenoyama Soh, Kurosaka Yoshitaka, "Semiconductor light-emitting element", Hamamatsu Photonics KK, 2019 (Year: 2019).*

*Primary Examiner* — YuJang Tswei
(74) *Attorney, Agent, or Firm* — Falk Ewers; Ewers IP Law PLLC

(57) ABSTRACT

A method for correcting a shading in a digital image of a three-dimensional observation object obtained by at least one image sensor of an optical observation device is provided. The three-dimensional observation object is illuminated by illumination light and an intensity distribution, and an inhomogeneity in an image brightness is present in the digital image of the three-dimensional observation object. The method includes ascertaining a topography of the three-dimensional observation object, correcting the inhomogeneity in the image brightness of the digital image based on the topography of the three-dimensional observation object and the intensity distribution of the illumination light. In addition, an optical observation system is provided to perform the method.

13 Claims, 5 Drawing Sheets

(51) Int. Cl.
*G06T 7/90* (2017.01)
*G06T 19/20* (2011.01)
*G06T 5/00* (2006.01)

(52) U.S. Cl.
CPC .......... *G06T 5/008* (2013.01); *G06T 2200/04* (2013.01); *G06T 2207/10028* (2013.01); *G06T 2207/10056* (2013.01); *G06T 2207/30096* (2013.01)

(56) References Cited

U.S. PATENT DOCUMENTS

| | | | |
|---|---|---|---|
| 2010/0188497 A1 | 7/2010 | Aizaki et al. | |
| 2011/0249039 A1* | 10/2011 | Ogi | G09G 3/3426 345/690 |
| 2014/0293035 A1 | 10/2014 | Horie | |
| 2015/0355446 A1 | 12/2015 | Kues et al. | |
| 2017/0221196 A1* | 8/2017 | Yamaguchi | G06F 3/0445 |
| 2018/0041744 A1* | 2/2018 | Fukuda | H04N 13/225 |
| 2018/0059398 A1 | 3/2018 | Koga | |
| 2018/0075583 A1* | 3/2018 | Hayasaka | G06T 5/50 |
| 2018/0285673 A1* | 10/2018 | Arnold | G06K 9/2027 |

* cited by examiner

METHOD FOR CARRYING OUT A SHADING CORRECTION AND OPTICAL OBSERVATION DEVICE SYSTEM

CROSS REFERENCE TO RELATED APPLICATIONS

This application claims priority to German patent application DE 10 2018 123 781.2, filed Sep. 26, 2018, the entire content of which is incorporated herein by reference.

TECHNICAL FIELD

The present disclosure relates to a method for carrying out a shading correction for a digital image of a three-dimensional observation object that was obtained by an image sensor of an optical observation device, said three-dimensional observation object being illuminated by illumination light having a certain intensity distribution. Additionally, the present disclosure relates to an optical observation device system including an optical observation device, which includes at least one image sensor for recording digital images of a three-dimensional observation object and an illumination apparatus for illuminating the observation object with illumination light having a certain intensity distribution. The optical observation device including the image sensor can be a microscope, more particularly a stereo microscope such as a surgical microscope, for example.

BACKGROUND

In some optical observation devices, for instance in surgical microscopes but occasionally also in the case of other microscopes, an emphasis of the illumination on the center should ensure a comfortable visual impression when looking into an eyepiece. Here, an emphasis of the illumination on the center means that the illumination intensity in the object field is set in such a way that the image brightness at the edge of the image field observed by the eyepiece decreases in relation to the center of the image field. This should provide a more comfortable view in the optical path, i.e., if the user uses an eyepiece to observe an intermediate image generated by purely optical means. However, this emphasis of the illumination on the center is also important for fluorescence applications. In these applications, the region of interest of the object field lies, as a rule, in the center of the image field. In this case, illuminating the object field in such a way that the image brightness in the center of the image field is higher than at its edge leads to the intensity of the illumination in the region of interest of the object field, i.e., in the region where fluorescence should be excited, being elevated in relation to the surrounding regions. This leads to a particularly strong fluorescence signal, which is very important, especially in the case of so-called low-degree tumors.

However, if the image field is recorded by an image sensor instead of being observed by an eyepiece and if the image field is subsequently presented on a monitor, the image brightness decreasing toward the edge has a negative effect. Therefore, efforts are made to correct this edge drop-off with the aid of a so-called shading correction in order to arrive at a uniform image brightness in the entire digital image.

In addition to being caused by illumination with emphasis on the center, an image brightness that drops off towards the edge could also be caused by vignetting, lens opacity, contaminants, etc., in the observation beam path. Moreover, an inhomogeneity of the illumination in the case of samples located in droplets may be caused by the passage of the illumination light through the droplets.

Shading methods are known for compensating such inhomogeneity; in these, at least one image of the object field is recorded without a sample being located therein in order to ascertain the distribution of the illumination intensity in the object plane therefrom and in order to subsequently calculate a correction factor which is then applied to the image with the observation object located in the object field. By way of example, such methods for shading correction are described in US 2010/0188497 A1 and in DE 10 2014 107 933 A1.

Additionally, shading corrections on the basis of algorithms are known. US 2009/0268053 A1 and US 2018/0059398 A1 describe shading corrections, in which a correction factor is calculated for each pixel in the digital image. In US 2009/0268053 A1, the correction factors are calculated on the basis of the recording of raw images with at least two different standard illuminations, for which corrections are calculated in each case. These corrections are stored and one of the corrections is selected depending on the illumination situation when recording an image. In US 2018/0059398 A1, first and second image groups are recorded from different directions and the correction factors are calculated on the basis of these images. Moreover, EP 2 796 916 A1 has disclosed a method for shading correction, in which a correction image is calculated from a number of images with a common image section. G 2 370 440 B moreover describes a method for shading correction, in which the angle of incidence of the illumination light on a film is considered when calculating the shading correction.

The methods described for shading correction supply good results if the illumination situation during the actual recording substantially corresponds to the illumination situation when recording the reference image and the observation object substantially lies within the object plane for which the reference measurements have been carried out. However, these preconditions are not met in some optical observation devices, for example in the case of surgical microscopes. As a rule, the observation objects observed in surgical microscopes have a three-dimensional topography. Moreover, the orientation of the surgical microscope relative to the observation object may vary during the application of the surgical microscope, i.e., during an operation, for example, as a result of which there is change in the illumination angle at which the object is illuminated. Particularly in the case of objects with a pronounced three-dimensional topography, the variation in the image brightness depends very strongly on the illumination angle and, moreover, it also depends on the distribution of the illumination across the illumination light cone. Therefore, the described methods for shading correction often do not supply satisfactory results. Similar difficulties may occur for observation objects with a pronounced three-dimensional topography in the case of reflected light microscopes (in which the illumination does not pass through the observation object) other than surgical microscopes, and so the described methods for shading correction may also supply unsatisfactory results in other reflected light microscopes.

SUMMARY

It is therefore an object of the present disclosure to provide a method for carrying out shading correction, which supplies good results, particularly also for a large range of orientations of an optical observation device in relation to the observation object. Additionally, it is an object of the disclosure to provide an advantageous optical observation system including an optical observation device, which is equipped with a shading correction device that supplies good results, more particularly also for a large range of orientations of the optical observation device in relation to the observation object.

A first object is achieved by a method for carrying out a shading correction and a second object is achieved by an optical observation device system as described herein.

According to an aspect of the disclosure, a method for carrying out a shading correction for a digital image of a three-dimensional observation object that was obtained by an image sensor of an optical observation device is provided, said observation object being illuminated by illumination light having a certain intensity distribution, wherein an inhomogeneity of the image brightness is present in the digital image of the observation object. By way of example, the optical observation device can be a microscope, more particularly a reflected light microscope such as, for instance, a surgical microscope. The method includes the following steps:

ascertaining a topography of a three-dimensional observation object; and correcting the inhomogeneity in the image brightness of the digital image on the basis of at least the ascertained topography and the intensity distribution of the illumination light. Here, the inhomogeneity in the image brightness may at least in part be caused by a predetermined inhomogeneous intensity profile of the illumination light, with the prescribed intensity profile then finding consideration in the intensity distribution of the illumination light.

Since not only the intensity distribution of the illumination light but also the ascertained topography can be considered in the method according to the disclosure, the shading correction can be ascertained exactly for a large range of illumination angles, even in the case of pronounced three-dimensional topographies. Here, the topography of the three-dimensional observation object specifies the geometric design of the surface of the observation object, for example in the form of a depth map.

Correcting the inhomogeneity in the image brightness of the digital image may include ascertaining correction factors for the brightness of the pixels or for the brightness of pixel groups in the digital image, in particular. Here, it is also possible to make the use of correction factors for individual pixels or the use of correction factors for pixel groups dependent on the location in the image. By way of example, the calculation of correction factors for pixel groups may suffice in images or image regions in which the intensity distribution in the illumination light and the geometric and topographic conditions lead to only a weakly varying image brightness; by contrast, the calculation of correction factors for individual pixels may be advantageous in images or image regions in which the intensity distribution in the illumination light and the geometric and topographic conditions lead to a strongly varying image brightness. Ascertaining correction factors for the brightness of the pixels or for the brightness of pixel groups in the digital image renders possible a shading correction that facilitates the respectively necessary resolution in the correction for different conditions.

For the purposes of calculating the correction factors, it is possible, in particular, to form the inverse of the intensity distribution of the illumination light within a virtual plane, the position of which in relation to the observation object is known. Then, the correction factors are calculated on the basis of a projection of the inverse of the intensity distribution, formed within the virtual plane, on the topography of the three-dimensional observation object. In this context, a virtual plane should be understood to mean an imagined plane which has any orientation in relation to the observation object and which intersects the illumination light cone, provided the orientation is such that the illumination light cone in the virtual plane is delimited by a closed contour, for example in the form of a circle or an ellipse. In this configuration, the inverse of the intensity distribution of the illumination light within the virtual plane supplies a measure for the intensity distribution of the illumination light, which can then be suitably scaled for each pixel or each pixel group by the projection on the topography.

The intensity distribution of the illumination light within the virtual plane can be ascertained by a calibration measurement. Alternatively, the intensity distribution of the illumination light within the virtual plane can be calculated taking account of the emission characteristic of the illumination light source emitting the illumination light and taking account of the position and, optionally, the orientation of the illumination light source (should the latter not be able to be considered a point light source) in relation to the virtual plane. Moreover, within the scope of this calculation, at least one of the following setting parameters of an illumination apparatus containing the illumination light source can be taken into account: a setting parameter which characterizes a zoom setting of the illumination apparatus, a setting parameter which characterizes a focal distance of the illumination apparatus, and a setting parameter which characterizes a stop setting of the illumination apparatus. Taking account of one or more of these parameters renders it possible to calculate the intensity distribution of the illumination light within the virtual plane with sufficient accuracy for each setting of the illumination apparatus. Calibration measurements for different combinations of the aforementioned parameters may occur in the case of calibration measurements. In relation to the calculation, the calibration measurement is advantageous in that it facilitates a greater accuracy when ascertaining the intensity distribution of the illumination light within the virtual plane. By contrast, the additional outlay for the calibration measurement is dispensed with when the intensity distribution is calculated. Thus, either the calibration method or the calculation method can be used, depending on the level of required accuracy. If setting parameters that characterize zoom position and/or a focal distance and/or a stop position of the illumination apparatus are taken into account when ascertaining the intensity distribution of the illumination light within the virtual plane, it is sufficient, as a rule, to respectively carry out a calibration measurement or calculate an intensity distribution for a few zoom levels and/or focal distances and/or stop settings. Intensity distributions within the virtual plane in the case of parameter values of the zoom setting and/or of the focal distance and/or of the stop setting, which do not correspond to the parameter values used during the calibration measurements or do not correspond to the parameters used during the calculation of the intensity distribution, can be interpolated from the intensity distributions ascertained during the calibration measurements or interpolated from the calculated intensity distributions.

It is advantageous if the intensity distribution within the virtual plane is normalized prior to the projection on the topography of the three-dimensional observation object. As a result of the normalization, the intensity distribution within the virtual plane becomes independent of the absolute intensity of illumination light source. Here, particularly in the case of a illumination with emphasis on the center, the normalization can be carried out in such a way that the value of the normalized intensity distribution within the virtual plane has a value of "1" in the center of the light spot formed within the virtual plane such that there is no correction, prompted by the shading correction, of the image brightness in the center of the image and the correction is restricted to the edge regions of the image.

Various methods are available for ascertaining the topography of the three-dimensional observation object. The optical observation device is embodied to record stereoscopic images in a first method. In this case, the topography of the three-dimensional observation object is ascertained on the basis of the recorded stereoscopic images. This method is advantageous, particularly in the case of stereo microscopes which already include an image sensor in each stereo channel, since the topography can be calculated by suitable software on the basis of the images recorded by the cameras, without this necessitating the installation of additional hardware in the beam path of the microscope. Moreover, the topography in this configuration is captured relative to the image sensors, and so the topography can be described in the coordinate system of the optical observation device and hence of the image sensors that were also used to record the image to be corrected.

A second option for ascertaining the topography of the three-dimensional observation object includes ascertaining the topography of the three-dimensional observation object on the basis of an image of the object recorded by a time-of-flight camera system. Time-of-flight camera systems are distinguished by being able to record images at a high image repetition rates such that the topography of the observation object can be updated at a high rate. This is advantageous, in particular, in the case of observation objects that are subject to quick changes in the topography thereof. If the position and orientation of the image sensors in relation to the observation subject and the position and the orientation of the time-of-flight camera system in relation to the observation subject are provided in different coordinate systems, a coordinate transformation is additionally carried out in this configuration in order to describe the topography in the coordinate system of the image sensors.

A third option for ascertaining the topography of the observation object includes the provision of an illumination apparatus for the structured illumination of the observation object and the ascertainment of the topography of the three-dimensional observation object on the basis of the distortion of the structure of the illumination in an image of the observation object recorded during the structured illumination, it being possible, more particularly, for said image to be recorded by the at least one image sensor of the optical observation device. In particular, the structured illumination can also be realized in an illumination apparatus of the optical observation device. If structured illumination is used, the structured illumination of the observation object can be implemented, more particularly, in a spectral range that lies outside of the actual spectral range observed by the optical observation device, i.e., for example, outside of the visible spectral range or outside of the spectral range in which a fluorescence should be excited or observed. This configuration renders it possible to simultaneously ascertain the topography of the observation object and carry out the actual observation of the observation object or the fluorescence. Otherwise, the observation would have to be interrupted for the purposes of ascertaining the topography. In this configuration, too, the topography is captured relative to the image sensor, and so the topography can be described in the coordinate system of the optical observation device and hence of the image sensor that were also used to record the image to be corrected.

A fourth option for ascertaining the topography of the observation object includes ascertaining the topography of the three-dimensional observation object with the aid of a laser scanner system. If the position and orientation of the laser scanner system in relation to the observation subject and the position and the orientation of the time-of-flight camera system in relation to the observation subject are provided in different coordinate systems, a coordinate transformation is additionally carried out in this configuration in order to describe the topography in the coordinate system of the image sensors.

It is advantageous, in the method according to the disclosure, if the topography of the three-dimensional observation object and the spatial position and the orientation of the at least one image sensor are all specified in the same coordinate system. If the inverse of the intensity distribution of the illumination light within the virtual plane is used to ascertain the correction factors, it is moreover advantageous if the position and the orientation of the virtual plane and the position of the light source, too, are specified in the same coordinate system as the topography of the three-dimensional observation object and the spatial position and orientation of the at least one image sensor. The orientation of the light source would advantageously also be specified in the same coordinate system in the case where the light source cannot be considered to be a point light source. The computational outlay can be minimized by using the same coordinate system as coordinate transformations are not required in this case. In order to obtain the topography of the three-dimensional observation object and the spatial position and orientation of the at least one image sensor and, optionally, the position and also the orientation of the virtual plane and the position of the light source (and also the orientation of the light source if the latter cannot be considered to be a point light source) in the same coordinate system, the topography, the positions and the orientations can be ascertained with the aid of a navigation system, for example.

An optical observation device system according to the disclosure includes:
  an optical observation device which includes at least one image sensor for recording digital images of a three-dimensional observation object;
  an illumination device to illuminate the observation object with illumination light having a certain intensity distribution;
  a topography ascertainment device to ascertain the topography of the observation object; and
  a shading correction device.

The shading correction device is connected to the at least one image sensor to record the digital image and connected to the topography ascertainment unit to receive the ascertained topography. It is configured to correct an inhomogeneity in the image brightness of the digital image on the basis of the received topography and the determined intensity distribution.

In the optical observation device system according to an aspect of the disclosure, the optical observation device can be, for example, a microscope, more particularly a reflected light microscope such as, for instance, a surgical microscope. Moreover, the illumination apparatus can be configured in such a way that it facilitates an illumination of the observation object using a predetermined inhomogeneous intensity profile, which at least in part causes the inhomogeneity in the image brightness.

The method according to an aspect of the disclosure can be carried out using the optical observation device system such that an inhomogeneity in the image brightness of the digital image can be compensated well, even if the observation object has a pronounced three-dimensional topography and the directions under which the observation object is observed can change.

In one configuration of the optical observation device system according to an aspect of the disclosure, the shading correction device is configured to ascertain correction factors for the brightness of the pixels or for the brightness of pixel groups in the digital image. In particular, the shading correction device can be configured in this case to ascertain the inverse of the intensity distribution of the illumination within a virtual plane, the position and orientation of which in relation to the observation object is known, and to calculate the correction factors on the basis of a projection of this inverse on the topography of the three-dimensional observation object. The advantages connected with this configuration of the shading correction device emerge immediately from the advantages described with respect to the corresponding method steps. Therefore, reference is made to the description of the method steps.

In the optical observation device system according to an aspect of the disclosure, the topography unit can more particularly include:
- a recording unit to record stereoscopic images and a calculation unit, which calculates the topography of the three-dimensional observation object on the basis of the recorded stereoscopic images; or
- a time-of-flight camera system and a calculation unit, which calculates the topography of the three-dimensional observation object on the basis of an image of the observation object recorded with the time-of-flight camera system; or
- an illumination apparatus for structured illumination of the observation object, a recording unit for recording an image of the observation object illuminated by the structured illumination and a calculation unit, which calculates the topography of the three-dimensional observation object on the basis of the distortion of the structure of the illumination in the image of the observation object illuminated by the structured illumination;
- or a laser scanner system.

The advantages connected with the described configurations of the topography ascertainment unit also emerge directly from the passages in which the ascertainment of the topography has been described with respect to the method according to an aspect of the disclosure. Therefore, reference is made to these passages.

Additional advantageous configurations of the optical observation system can be derived from the description of the method.

BRIEF DESCRIPTION OF THE DRAWINGS

The disclosure will now be described with reference to the drawings wherein.

DESCRIPTION OF EXEMPLARY EMBODIMENTS

The basic structure of the surgical microscope 2, which represents the optical observation device in the subsequent exemplary embodiments of the disclosure, is explained below with reference to FIG. 1. However, the disclosure can also be used in other microscopes, more particularly other reflected light microscopes.

Figure 1:
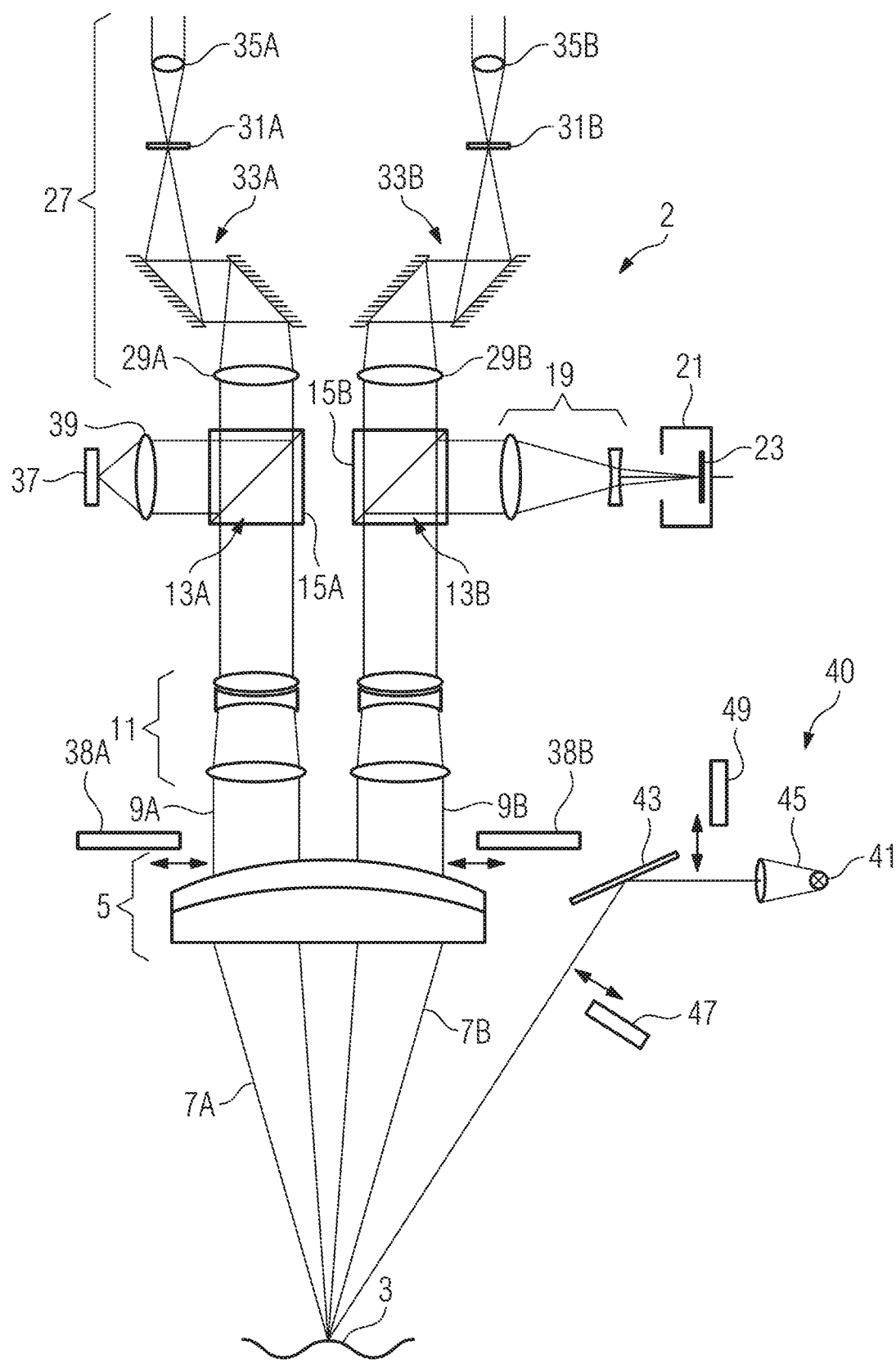
FIG. 1 shows a schematic illustration of the structure of a surgical microscope having an optical eyepiece, FIG. 2 schematically shows the basic structure of a varioscope objective.

The surgical microscope 2 shown in FIG. 1 includes an objective 5 that should face an object field 3, said objective, in particular, being able to be embodied as an achromatic or apochromatic objective. In the present exemplary embodiment, the objective 5 includes two partial lenses that are cemented to one another and form an achromatic objective. The object field 3 is arranged in the focal plane of the objective 5 such that it is imaged at infinity by the objective 5. Expressed differently, a divergent beam 7 emanating from the object field 3 is converted into a parallel beam 9 during its passage through the objective 5.

A magnification changer 11 is arranged on the observer side of the objective 5, which magnification changer can be embodied either as a zoom system for changing the magnification factor in a continuously variable manner as in the illustrated exemplary embodiment, or as what is known as a Galilean changer for changing the magnification factor in a stepwise manner. In a zoom system, constructed by way of example from a lens combination having three lenses, the two object-side lenses can be displaced in order to vary the magnification factor. In actual fact, however, the zoom system also can have more than three lenses, for example four or more lenses, in which case the outer lenses then can also be arranged in a fixed manner. In a Galilean changer, by contrast, there are a plurality of fixed lens combinations which represent different magnification factors and which can be introduced into the beam path alternately. Both a zoom system and a Galilean changer convert an object-side parallel beam into an observer-side parallel beam having a different beam diameter. In the exemplary embodiment, the magnification changer 11 already is part of the binocular beam path of the surgical microscope 1, i.e., it has a dedicated lens combination for each stereoscopic partial beam path 9A and 9B of the surgical microscope 1. In the present exemplary embodiment, a magnification factor is adjusted by the magnification changer 11 by way of a motor-driven actuator which, together with the magnification changer 11, is part of a magnification changing unit for adjusting the magnification factor.

In the exemplary embodiment, the magnification changer 11 is adjoined on the observer side by an interface arrangement 13A, 13B, by which external devices can be connected to the surgical microscope 1 and which includes beam splitter prisms 15A and 15B. However, in principle, use can also be made of other types of beam splitters, for example partly transmissive mirrors. In the exemplary embodiment, the interfaces 13A and 13B serve to output couple a beam from the beam path of the surgical microscope 2 (beam splitter prism 15B) and/or to input couple a beam into the beam path of the surgical microscope 2 (beam splitter prism 15A). However, they may both also be embodied to output couple a beam from the beam path of the surgical microscope 2 or both be embodied to input couple a beam into the beam path of the surgical microscope 2.

In the present exemplary embodiment, the beam splitter prism 15A in the partial beam path 9A serves to mirror information or data for an observer into the partial beam path 9A of the surgical microscope 1 with the aid of a display 37, for example a digital mirror device (DMD) or a liquid crystal display (LCD) display, and an associated optical unit 39 by the beam splitter prism 15A. A camera adapter 19 with a camera 21 fastened thereto, said camera being equipped with an electronic image sensor 23, for example with a charge-coupled device (CCD) sensor or a complementary metal-oxide semiconductor (CMOS) sensor, is arranged at the interface 13B in the other partial beam path 9B. By the camera 21, it is possible to record an electronic image and, in particular, a digital image of the tissue region 3. In particular, a hyperspectral sensor also can find use as an image sensor, said hyperspectral sensor having not only three spectral channels (e.g., red, green, and blue) but a plurality of spectral channels. If both interfaces 13A and 13B are embodied to output couple a beam from the beam path of the surgical microscope 2, a camera adapter 19 with a camera 21 fastened thereto can be arranged on both interfaces 13A and 13B in each case. This allows spectroscopic images to be recorded.

In the exemplary embodiment, the interface 13 is adjoined on the observer side by a binocular tube 27. The latter has two tube objectives 29A and 29B, which focus the respective parallel beam 9A and 9B onto an intermediate image plane 31, i.e., image the object field 3 on the respective intermediate image plane 31A and 31B. The intermediate images located in the intermediate image planes 31A and 31B are finally imaged at infinity in turn by eyepiece lenses 35A and 35B, such that an observer can observe the intermediate image with a relaxed eye. Moreover, an increase in the distance between the two partial beams 9A and 9B is implemented in the binocular tube by a mirror system or by prisms 33A and 33B in order to adapt said distance to the interocular distance of the observer. In addition, image erection is carried out by the mirror system or the prisms 33A and 33B.

The surgical microscope 2 is moreover equipped with an illumination apparatus 40, by which the object field 3 can be illuminated with illumination light. To this end, the illumination apparatus 40 has a white-light source 41, for example a halogen lamp or a gas discharge lamp. The light emanating from the white-light source 41 is directed in the direction of the object field 3 via a deflection mirror 43 or a deflection prism in order to illuminate said field. Furthermore, an illumination optical unit 45 is present in the illumination apparatus 40, said illumination optical unit ensuring uniform illumination of the entire observed object field 3. Here, the illumination optical unit 45 may also include a zoom system, which can modify the size of the illumination light spot, and/or a system which allows the focal distance of the illumination optical unit to be varied. Moreover, the illumination apparatus 40 may be equipped with a light source for emitting light that excites a fluorescence in the observation object. Alternatively, as illustrated in FIG. 1, a spectral filter 47 may be present; the latter can be introduced into the illumination beam path and only allows those spectral constituents of the light of the white light source 41 to pass that excite a fluorescence in the observation object. Then, filters 40A and 40B are introduced into the illumination beam path, said filters blocking those spectral constituents in the observation object that excite the fluorescence. Further, the illumination apparatus 40 includes an apparatus that facilitates an illumination of the observation object with a predetermined inhomogeneous intensity profile. In the exemplary embodiment shown in FIG. 1, the apparatus includes one or more stops and/or lenses 49, plotted schematically in FIG. 1, by which the profile of the illumination light cone emanating from the light source can be influenced. In particular, an illumination profile with emphasis on the center can be generated by the apparatus. The at least one stop and/or at least one lens 49 can be introduced into the illumination beam path when necessary. If an illumination profile with emphasis on the center should be used permanently, the at least one stop and/or at least one lens 49 may be arranged permanently in the beam path in alternative configurations. Furthermore, the illumination apparatus may include stops that can bring about a sharp delimitation of the luminous field in the object field.

Reference is made to the fact that the illumination beam path illustrated in FIG. 1 is very schematic and does not necessarily reproduce the actual course of the illumination beam path. In principle, the illumination beam path can be embodied as so-called oblique illumination, which comes closest to the schematic illustration in FIG. 1. In such oblique illumination, the beam path extends at a relatively large angle (6° or more) with respect to the optical axis of the objective 5 and, as illustrated in FIG. 1, may extend completely outside the objective. Alternatively, however, there is also the possibility of allowing the illumination beam path of the oblique illumination to extend through a marginal region of the objective 5. A further option for the arrangement of the illumination beam path is the so-called 0° illumination, in which the illumination beam path extends through the objective 5 and is input coupled into the objective between the two partial beam paths 9A and 9B, along the optical axis of the objective 5 in the direction of the object field 3. Finally, it is also possible to embody the illumination beam path as so-called coaxial illumination, in which a first illumination partial beam path and a second illumination partial beam path are present. The illumination partial beam paths are input coupled into the surgical microscope in a manner parallel to the optical axes of the observation partial beam paths 9A and 9B by way of one or more beam splitters such that the illumination extends coaxially in relation to the two observation partial beam paths.

In the exemplary embodiment of the surgical microscope 2 shown in FIG. 1, the objective 5 only includes an achromatic lens with a fixed focal length. However, use can also be made of an objective lens system made of a plurality of lenses, in particular a so-called varioscope objective, by which it is possible to vary the working distance of the surgical microscope 2, i.e., the distance between the object-side focal plane and the vertex of the first object-side lens surface of the objective 5, also referred to as front focal distance. The object field 3 arranged in the focal plane is imaged at infinity by the varioscope objective 50, too, and so a parallel beam is present on the observer side.

Figure 2:
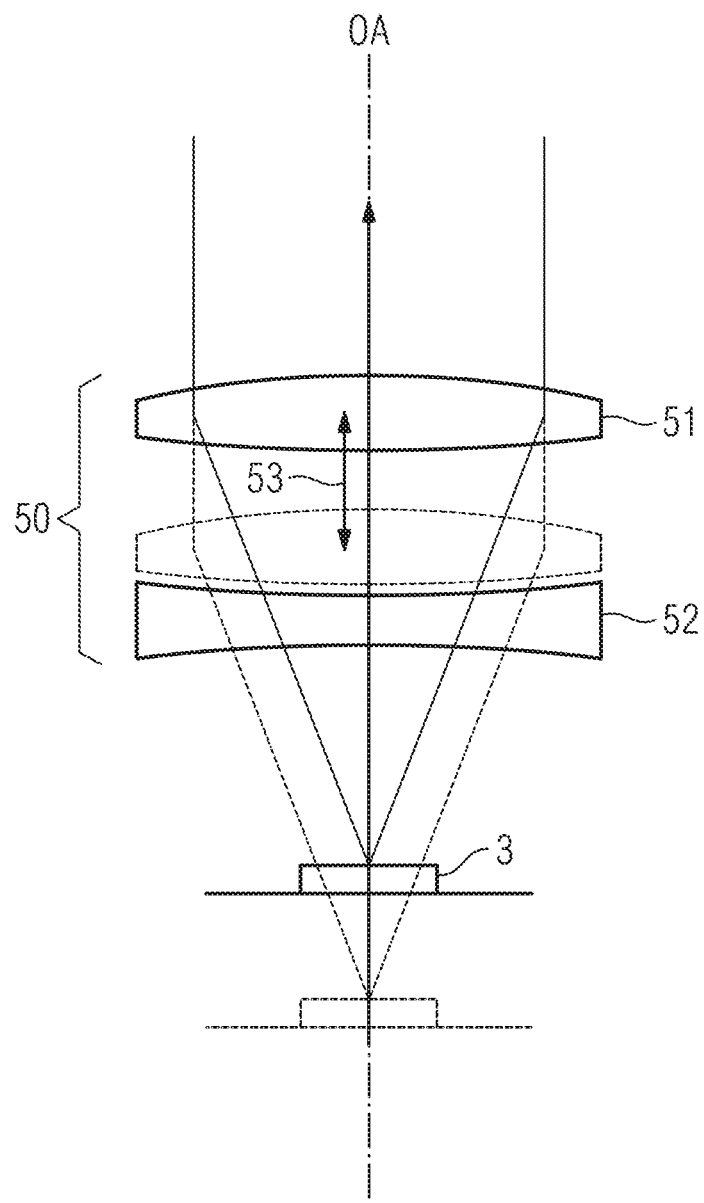

One example of a varioscope objective is illustrated schematically in FIG. 2. The varioscope objective 50 includes a positive member 51, i.e., an optical element having positive refractive power, which is schematically illustrated as a convex lens in FIG. 2. Moreover, the varioscope objective 50 includes a negative member 52, i.e., an optical element having negative refractive power, which is schematically illustrated as a concave lens in FIG. 2. The negative member 52 is located between the positive member 51 and the object field 3. In the illustrated varioscope objective 50, the negative member 52 has a fixed arrangement, whereas, as indicated by the double-headed arrow 53, the positive member 51 is arranged to be displaceable along the optical axis OA. When the positive member 51 is displaced into the position illustrated by dashed lines in FIG. 2, the back focal length increases, and so there is a change in the working distance of the surgical microscope 2 from the object field 3.

Even though the positive member 51 has a displaceable configuration in FIG. 2, it is also possible, in principle, to arrange the negative member 52 to be movable along the optical axis OA instead of the positive member 51. However, the negative member 52 often forms the last lens of the varioscope objective 50. A stationary negative member 52 therefore offers the advantage of making it easier to seal the interior of the surgical microscope 2 from external influences. Furthermore, it is noted that, even though the positive member 51 and the negative member 52 in FIG. 2 are only illustrated as individual lenses, each of these members may also be realized in the form of a lens group or a cemented element instead of in the form of an individual lens, for example to embody the varioscope objective to be achromatic or apochromatic.

Figure 3:
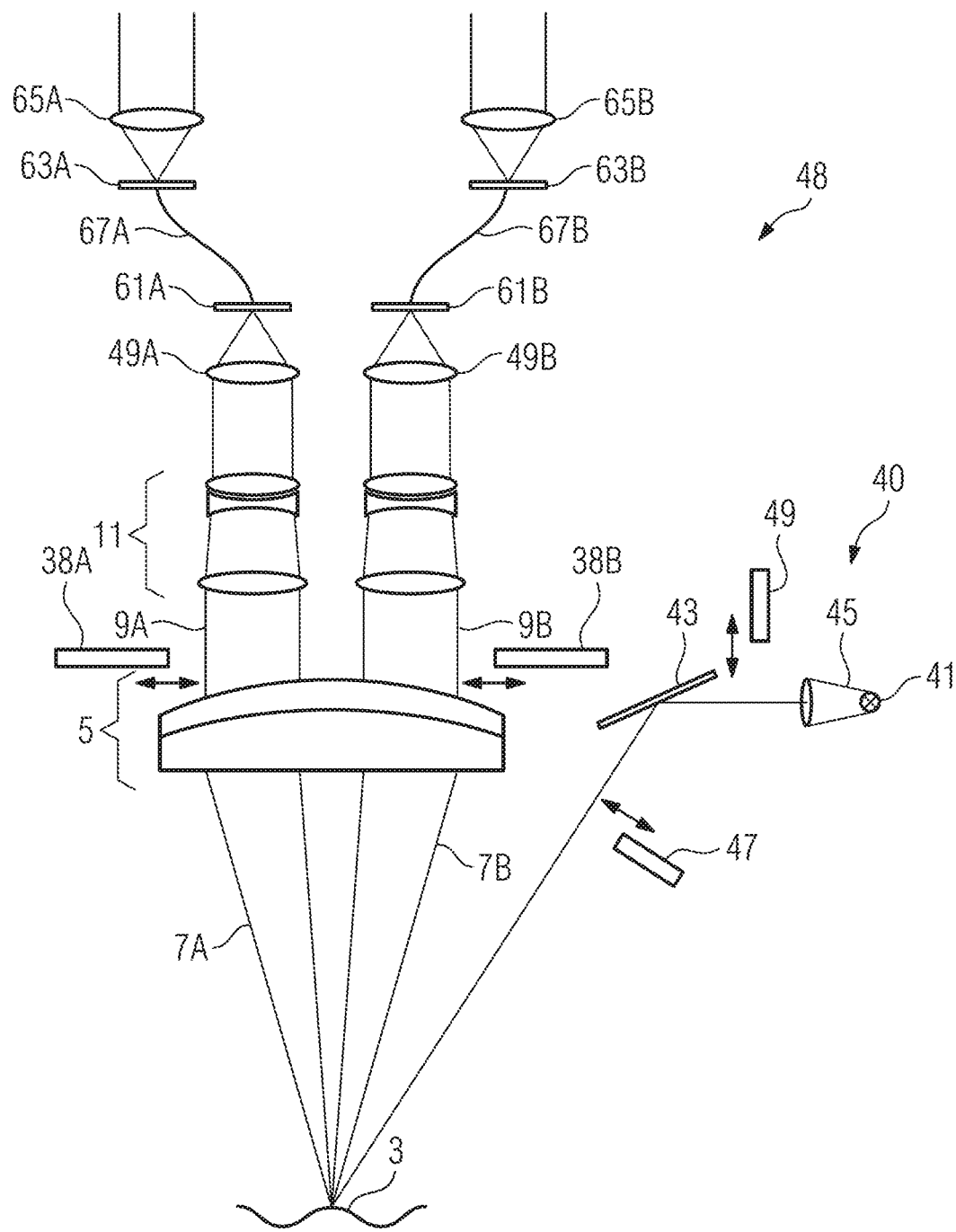
FIG. 3 shows a schematic illustration of a digital surgical microscope.

FIG. 3 shows a schematic illustration of an exemplary embodiment of a digital surgical microscope 48. In this surgical microscope, the main objective 5, the magnification changer 11, and the illumination system 41, 43, and 45 do not differ from the surgical microscope 2 with the optical view that is illustrated in FIG. 1. The difference lies in the fact that the surgical microscope 48 shown in FIG. 3 does not include an optical binocular tube. Instead of the tube objectives 29A and 29B from FIG. 1, the surgical microscope 48 from FIG. 3 includes focusing lenses 49A and 49B, by which the binocular observation beam paths 9A and 9B are imaged on digital image sensors 61A and 61B. Here, the digital image sensors 61A and 61B can be, e.g., CCD sensors or CMOS sensors. The images recorded by the image sensors 61A and 61B are transmitted digitally to digital displays 63A and 63B, which may be embodied as light emitting diode (LED) displays, as LCD displays or as displays based on organic light-emitting diodes (OLEDs). Like in the present example, eyepiece lenses 65A and 65B can be assigned to the displays 63A and 63B, by which the images displayed on the displays 63A and 63B are imaged at infinity such that an observer can observe said images with relaxed eyes. The displays 63A and 63B and the eyepiece lenses 65A and 65B can be part of a digital binocular tube; however, they can also be part of a head-mounted display (HMD) such as, e.g., a pair of smartglasses.

Even though FIG. 3, like FIG. 1, only illustrates an achromatic lens 5 with a fixed focal length, the surgical microscope 48 shown in FIG. 3 may include a varioscope objective instead of the objective lens 5, like the surgical microscope 2 illustrated in FIG. 1. Furthermore, FIG. 3 shows a transfer of the images recorded by the image sensors 61A and 61B to the displays 63A and 63B by cables 67A and 67B. However, instead of in a wired manner, the images can also be transferred wirelessly to the displays 63A and 63B, especially if the displays 63A and 63B are part of a head-mounted display.

Figure 4:
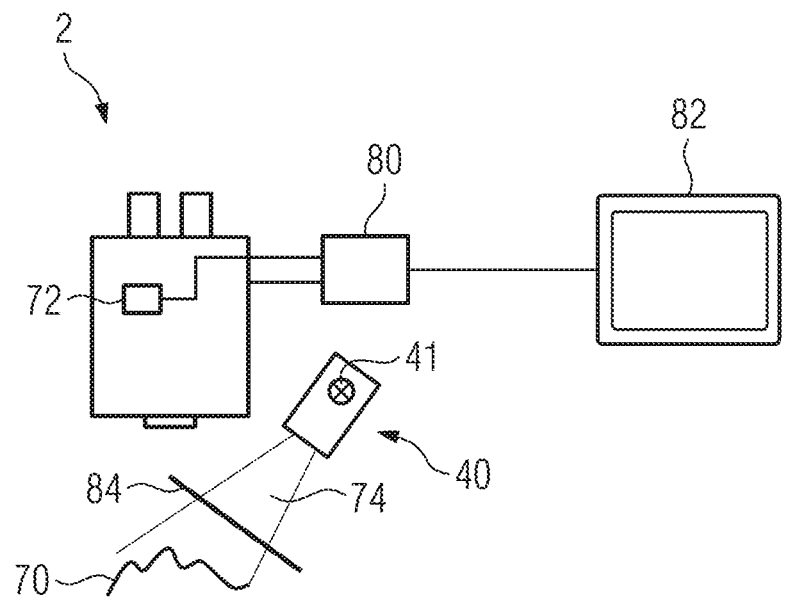
FIG. 4 shows an optical observation device system including a shading correction device according to a first exemplary embodiment.

FIG. 4 shows an optical observation device system according to an exemplary embodiment of the disclosure, including a surgical microscope 2, as explained with reference to FIGS. 1 to 3, as an optical observation device. Here, either image sensors 23 of cameras 21, as described with reference to FIG. 1, or image sensors 61A and 61B, as described with reference to FIG. 3, can be used as image sensors for recording digital images of a three-dimensional observation object 70. A camera 21 with an image sensor 23 is located in each stereoscopic partial beam path of the surgical microscope 2 in the present exemplary embodiment of the optical observation device system, and so stereoscopic images can be recorded. A calculation unit 72 arranged in or on the surgical microscope 2 in the exemplary embodiment receives a stereoscopic image of the observation object 70 and calculates the topography of the observation object 70, i.e., the three-dimensional surface geometry of the observation object 70, on the basis of the stereoscopic partial images. Therefore, together with the calculation unit 72, the image sensors 23 of the cameras 21 form the topography ascertainment unit of the optical observation device system in the exemplary embodiment. The digital image for which a shading correction should be implemented is also produced with the aid of image sensors 23 of the cameras 21 in the exemplary embodiment.

Moreover, the optical observation device system includes an illumination apparatus 40, as has been described with reference to FIG. 1. An illumination light cone 74 emanating from the illumination apparatus 40 has an intensity profile with an emphasis on the center in the exemplary embodiment in order to provide a user observing the observation object by the eyepiece lenses 35A and 35B with a comfortable visual impression. In the exemplary embodiment, the illumination apparatus 40 is integrated in the surgical microscope 2 and hence securely arranged relative to the image sensors 23 of the surgical microscope 2.

If the topography of stereoscopic partial images recorded by the surgical microscope 2 is ascertained, like in the exemplary embodiment, the topography is calculated directly with respect to the image sensors 23 that also record the image to be corrected. Therefore, it can be ascertained in the coordinate system of the image sensors 23 and consequently in the coordinate system of the surgical microscope 2 and of the illumination apparatus 40. Position and orientation of the image sensors 23 and of the light source 41 in relation to the topography of the observation object 70 are consequently known in the same coordinate system. Then, the calculations required for the shading correction can be carried out in this coordinate system.

Figure 5:
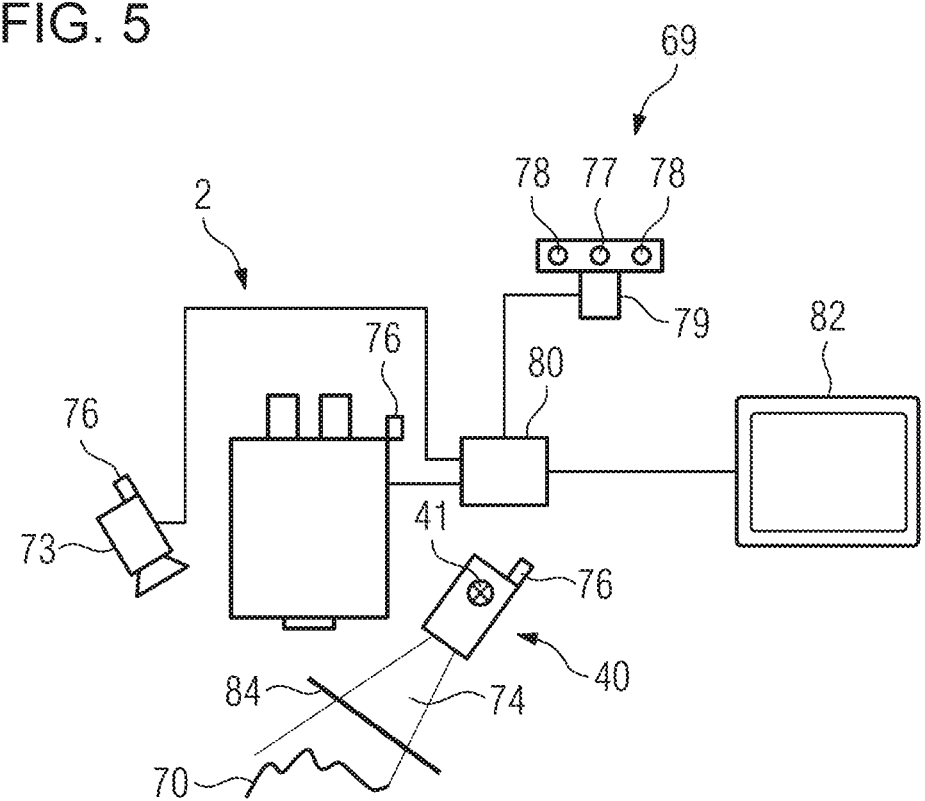
FIG. 5 shows an optical observation device system including a shading correction device according to a first exemplary embodiment.

Should the topography not be ascertained on the basis of stereoscopic partial images recorded by the surgical microscope 2 but, instead, be ascertained, like in the exemplary embodiment illustrated in FIG. 5, with the aid of an external time-of-flight camera system 73 or any other external topography capturing unit, the ascertained topography is present in the coordinate system of the respective topography capturing unit. In this case, it is necessary to transform the topography ascertained by the external topography capturing unit, i.e., the topography ascertained by the time-of-flight camera system 73 in the exemplary embodiment illustrated in FIG. 5, into a coordinate system in which the position and the orientation of the surgical microscope 2—and hence the position and the orientation of the image sensors 23 and of the illumination apparatus 40 with the light source 41—are also specified. Therefore, a navigation system 69 in the exemplary embodiment illustrated in FIG. 5 serves to ascertain the position and the orientation of the surgical microscope 2 on the one hand and the position and the orientation of the time-of-flight camera system 73 on the other hand. Consequently, the position and the orientation of the time-of-flight camera system 73 and the position and the orientation of the surgical microscope 2 are then known in a common coordinate system, specifically the coordinate system of the navigation system 69. The coordinates of the common coordinate system can be considered to be global coordinates and the common coordinate system can be considered to be a global coordinate system. The position and the orientation of the image sensors 23 and the position and the orientation of the illumination light source 41 in the global coordinate system emerge from the respectively known installation position and orientation of the image sensors 23 and of the illumination light source 41 in the surgical microscope 2 and the illumination apparatus 40 integrated therein. The coordinates of the time-of-flight camera system 73, in which the topography is specified, can be transformed into coordinates of the global coordinate system on the basis of the position and orientation, both of which are known in the global coordinate system, of the time-of-flight camera system 73. Then, the calculations required for the shading correction can be carried out in this global coordinate system. By way of example, for the purposes of ascertaining position and orientation of the surgical microscope 2 and of the time-of-flight camera system 73 in the global coordinates, the navigation system 69 may include an infrared sensor 77, the latter emitting infrared light that is reflected by markers 76 arranged on the surgical microscope 2 and on the time-of-flight camera system 73. The infrared rays of the infrared sensor 77 reflected by the markers 76 are detected by two infrared receivers 78. Then, a computer 79 can ascertain the position and orientation of the marked objects in the global coordinate system on the basis of the detected reflected infrared rays.

In the exemplary embodiment, the illumination apparatus 40 is integrated in the surgical microscope and hence securely arranged relative to the surgical microscope 2. Therefore, the illumination angle at which the observation object 70 is illuminated changes if the position and/or orientation of the surgical microscope 2 is modified relative to the observation object 70. The angles of incidence of the light rays of the illumination light cone on a surface section of the observation object 70 depend firstly on the illumination angle at which the observation object 70 is illuminated and secondly on the surface normal of the surface section on which they are incident. Depending on the orientation of the surface normal, the illumination intensity (luminous power per unit area) on the surface section can be different in the case of the same illumination angle. On account of its three-dimensional topography, different illumination intensities may be present, even in the case of the same illumination angle, depending on the illumination angle at different locations of the topography, leading to local variations in the image brightness. Within the scope of the shading correction in the prior art, no decision can be made as to whether such local variations in the image brightness can be traced back to the topography of the observation object or to inhomogeneity in the illumination. Therefore, incorrect corrections may arise within the scope of a shading correction according to the prior art. With the aid of the topography ascertained within the scope of the disclosure, local variations in the illumination intensity that can be traced back to the topography can be correctly taken into account, and so a reliable shading correction is possible for a large range of illumination angles, even in the case of observation objects with a pronounced three-dimensional topography.

In order to carry out the shading correction, the exemplary embodiments of the optical observation device system illustrated in FIG. 4 and FIG. 5 each include a shading correction device 80 which, in the case of the exemplary embodiment illustrated in FIG. 4, is connected to the calculation unit 72 of the topography ascertainment unit for the purposes of receiving the topography. In the case of the exemplary embodiment illustrated in FIG. 5, the shading correction device 80 is connected to the time-of-flight camera system 73 for the purposes of receiving the topography. Moreover, for the purposes of receiving position and orientation of the time-of-flight camera system 73 and position and orientation of the surgical microscope 2—and hence of the image sensors 23 and of the light source 41—in the global coordinate system, it is connected to the computer 79 of the navigation system 69. Moreover, the shading correction device 80 is connected to the surgical microscope 2 in both exemplary embodiments for the purposes of receiving the images of the observation object for which a shading correction should be undertaken, said images having been recorded with the aid of the image sensors 23 of the cameras 21 and being three-dimensional images in the present exemplary embodiment. The shading correction unit 80 calculates a shading correction on the basis of the ascertained topography and the position and orientation of the image sensors 23 and the position and orientation of the light source relative to the topography of the observation object 70, said shading correction correcting a digital image received from the surgical microscope 2 in such a way that a non-uniform image brightness due to an inhomogeneous illumination is compensated when the digital image is displayed on a monitor 82.

Should it be necessary for the position and/or the orientation of the illumination apparatus 40 to be modified during the use of the optical observation device system, it is possible to ascertain the position and/or the orientation of the illumination apparatus 40 relative to the observation object 70, and consequently it is possible to ascertain the position and the orientation of the light source 41 relative to the observation object 70, likewise with the aid of a navigation system 69 and a marker 76 fastened to the illumination apparatus 40.

The method for carrying out the shading correction will be described below with reference to FIGS. 6 and 7.

Figure 6:
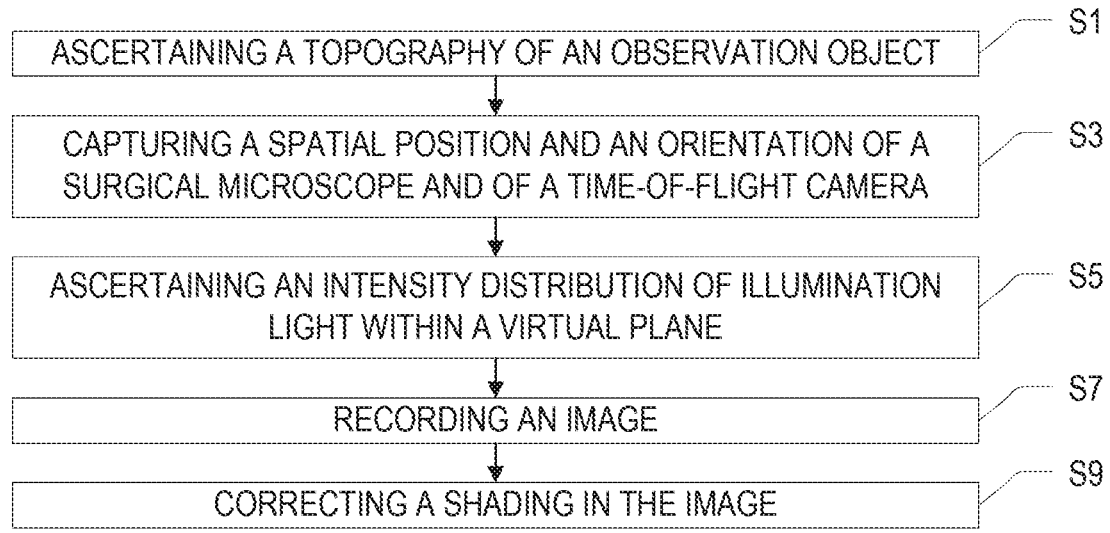
FIG. 6 shows, on the basis of a flowchart, how a shading correction is carried out.
Figure 7:
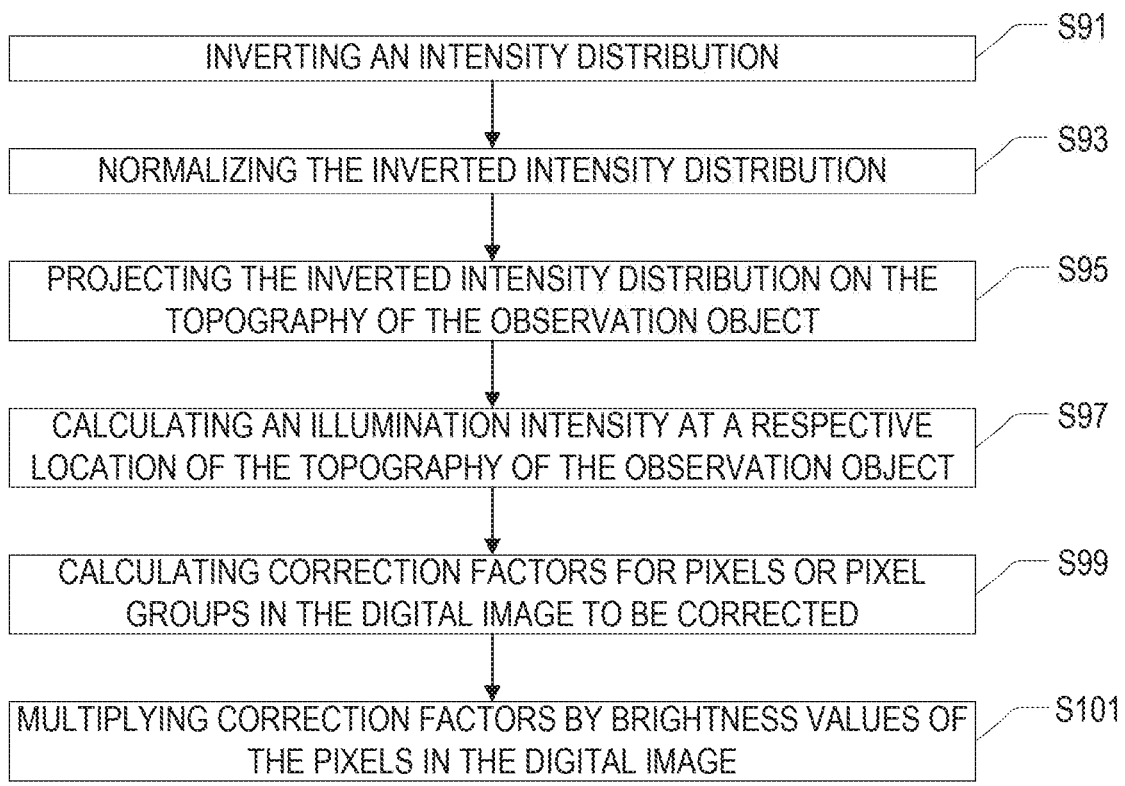
FIG. 7 shows, on the basis of a flowchart, how correction factors are calculated within the scope of the shading correction.

On the basis of a flowchart, FIG. 6 shows the method steps carried out when performing the shading correction. When performing the shading correction, the topography of the observation object 70 is ascertained in step S1. In the exemplary embodiment shown in FIG. 4, a stereoscopic image, from which the calculation unit 72 ascertains the topography, is recorded by the image sensors 23 of the cameras. If, like the surgical microscope 2 described with reference to FIG. 4, the optical observation device 2 of the optical observation device system is able to record stereoscopic digital images of the observation object 70 and able to ascertain the topography therefrom with the aid of a calculation unit 72, this offers the advantage that the topography is ascertained on the basis of the same beam path that is also used for recording the digital image for which a shading correction should be performed, and so it is possible to dispense with conversions on account of different orientations of the optical observation device and the topography capturing unit. In principle, it is also possible to equip the optical observation device employed in the optical observation device system with a topography capturing unit that is not based on an ascertainment of the topography on the basis of stereoscopic images. By way of example, the use of a time-of-flight camera system, as shown in FIG. 5, is conceivable. However, the use of a laser scanner or the use of structured illumination are also conceivable. In the latter case, a certain illumination pattern is projected on the observation object and the topography is calculated on the basis of the distortion of the illumination pattern in the recorded digital image. The latter variant can be carried out in such a way that the structured illumination is implemented with the aid of the illumination apparatus 40 and the recording of the image obtained during the structured illumination is implemented with the aid of the optical observation device, i.e., with the aid of the surgical microscope 2 in the case of the exemplary embodiment illustrated in FIG. 4. In this case, too, it is possible to avoid conversions on account of different orientations of the optical observation device of the topography capturing unit. If the projection of the pattern on the observation object 40 is implemented in a wavelength range that is not used for the actual observation of the observation object 70 with the aid of the optical observation device, ascertaining the topography and recording the image of the observation object, for which a shading correction should be performed, can be implemented at the same time. By way of example, the pattern can be projected in the infrared wavelength range if an observation of the observation object should be implemented in the visible wavelength range. In the case of a fluorescence observation, the projection of the pattern can be implemented in a wavelength range that is neither suitable for exciting the fluorescence nor corresponds to the wavelength range in which the fluorescence is implemented.

In the case of the exemplary embodiment shown in FIG. 5, the spatial position and orientation of the surgical microscope 2 and of the time-of-flight camera 73 are captured in step S3. Position and orientation of the surgical microscope 2 and of the time-of-flight camera 73 can be ascertained with the aid of a navigation system 69, as has been described with reference to FIG. 5. If the optical observation device can be modified only in its position or only in its orientation, capturing of the unchanging orientation or the unchanging position can be implemented by reading variables representing the unchanging orientation or the unchanging position from a memory in which these variables are saved, and so only variables representing the changeable position or the changeable orientation have to be ascertained with the aid of the navigation system 69. If the position and/or the orientation of the illumination apparatus 40 is changeable independently of the position and/or the orientation of the surgical microscope 2, this is likewise ascertained with the aid of the position capturing unit, i.e., with the aid of the navigation system 69, for example. Should only the position or the orientation be changeable, it is also possible in this case to implement the capture of the respective unchangeable orientation or position by reading variables representing the unchangeable orientation of position from a memory, in which these variables are saved. Even though steps S1 and S3 are illustrated in sequence in FIG. 6, they may naturally also be carried out in parallel or in the reverse sequence.

In the case of the exemplary embodiment illustrated in FIG. 4, in which the topography is ascertained on the basis of stereoscopic images recorded by the surgical microscope 2, step S3 is dispensed with since the relative position and the relative orientation of the topography of the observation object 70 in relation to the position and the orientation of the surgical microscope 2 already emerges from the manner in which the topography is ascertained. A corresponding statement applies if the topography is ascertained on the basis of structured illumination and if use is made for this purpose of an image sensor 23 of the surgical microscope 2 and of the light source 41 of the surgical microscope 2.

The intensity distribution of the illumination light cone 74 within a virtual plane 84, the position and orientation of which relative to the topography of the observation object 70 and relative to the light source 41 of the illumination apparatus 40 are known, is ascertained in step S5. Since the position and orientation of the light source 41 of the illumination device 40 and of the image sensors 23 on the one hand and of the topography of the observation object 70 on the other hand are either known from the ascertainment of the topography in the same coordinate system, like in the exemplary embodiment illustrated in FIG. 4, or can be ascertained in a common global coordinate system with the aid of the positions and/or orientations ascertained in step S3, like in the exemplary embodiment illustrated in FIG. 5, it is possible, in both cases, to describe the position and orientation of the virtual plane 84 in the coordinate system in which the position and orientation of the light source 41 and the position of the orientation of the topography are also described. In principle, how the plane 84 is oriented with respect to the topography of the observation object 70 and with respect to the light source 41 of the illumination apparatus 40 is irrelevant in this case provided that the illumination light cone 74 in the plane 84 is restricted by a closed contour, for example in the form of a circle or an ellipse.

The intensity distribution within the virtual plane 84 can be ascertained using an optics calculation on the basis of the known position and orientation of the light source 41 in relation to the virtual plane 84, with the parameters of the light source such as, for instance, the emission characteristics, the intensity of the light source, etc., being taken into account. However, it is also possible to measure intensity profiles for certain positions and orientations of the virtual plane 84 relative to the illumination apparatus 40, and hence relative to the illumination light source 41, in preceding calibration measurements. To this end, use can be made of the planar sensor, for example, the latter being placed within the virtual plane 84 such that it covers the entire illumination light cone. Then, if the relative position between illumination device 40 and the virtual plane 84 when ascertaining the intensity distribution does not correspond to the relative position between the illumination apparatus 40 and the virtual plane 84 in one of the calibration measurements, the intensity distribution within the virtual plane 84 can be interpolated from intensity profiles that have been ascertained by calibration measurements.

The zoom setting of the illumination zoom, stops introduced into the illumination beam path and the focal distance of the illumination optical unit are also taken into account when ascertaining the intensity distribution within the virtual plane 84.

The image for which the shading correction should be performed is recorded in step S7. The image recorded in S7 can be either a monoscopic image or a stereoscopic image. In the case of a stereoscopic image, the individual stereoscopic partial images are treated like monoscopic images and a dedicated shading correction is performed for each stereoscopic partial image. A person skilled in the art recognizes that the image for which the shading correction should be performed may also have been recorded prior to step S5, step S3 or even step S1. It is also possible to carry out one or more of steps S1, S3, and S7 in parallel.

Finally, the shading is corrected in the recorded image in step S9 with the aid of the topography ascertained in step S1 and the intensity distribution ascertained in step S5. The shading correction performed in step S9 is explained in detail below with reference to FIG. 7.

In step S91, the intensity distribution ascertained in step S5 is inverted in order to obtain an inverted intensity distribution. Then, the inverted intensity distribution is normalized in step S93. In the present exemplary embodiment, the normalization is implemented in such a way that the intensity distribution in the center of the closed contour in the virtual plane 84 assumes a value of "1". In the case of an illumination with emphasis in the center, the highest illumination intensity within the virtual plane is present at this point.

Thereupon, the inverted intensity distribution is projected in step S95 on the topography of the observation object 70, i.e., on the surface geometry of the observation object 70. This projection can be performed since both the position and orientation of the observation object 70 and the position and orientation of the virtual plane 84 and also the position and orientation of the illumination light source 41—and hence the profile of the illumination light cone—are known in the same coordinate system. Coordinate transformations would still have to be carried out should this not be the case.

The illumination intensity at the respective location of the topography is calculated by the shading correction device 80 in step S97 from the projection of the inverted and normalized intensity distribution on the topography of the observation object 70 and, from this, correction factors for pixels or pixel groups in the digital image to be corrected are calculated by said apparatus in step S99 in turn, with the correction factors serving to compensate reductions in the illumination intensity that are based on the intensity distribution, ascertained in step S5, within the virtual plane 84.

In principle, a dedicated correction factor can be calculated for each pixel in the digital image to be corrected. However, it is also possible to combine pixels in the digital image to be corrected to form pixel groups and to ascertain respectively one correction factor common to all pixels for the pixels of a pixel group. This lends itself particularly to those image regions in which the variations in the image brightness resulting from the intensity distribution, ascertained in step S5, within the virtual plane 84 have a low spatial frequency such that the variations between adjacent pixels are low. It is advantageous to calculate an individual correction factor for each pixel in image regions in which the brightness variations caused by the intensity distribution, ascertained in step S5, within the virtual plane 84 have a high spatial frequency. Naturally, an individual space factor can also be calculated for each pixel in the case of low spatial frequencies.

Finally, in step S101, the correction factors are multiplied by the brightness values of the pixels in the digital image to be corrected in order to arrive at an image with shading correction.

The present disclosure has been described in detail on the basis of exemplary embodiments for explanatory purposes. However, a person skilled in the art recognizes that not all features of the exemplary embodiment are mandatory. By way of example, unlike in the exemplary embodiment, the optical observation device need not be a surgical microscope. The present disclosure is also suitable for the shading correction in the case of other types of reflected light microscopes, for example microscopes for material testing or scientific reflected light microscopes. Furthermore, the optical observation device can be a purely digital optical observation device, as has been described with reference to FIG. 3. Moreover, a person skilled in the art recognizes that some steps that were carried out sequentially in succession within the scope of the exemplary embodiments could also be carried out in a modified sequence or could also be carried out in parallel with one another. Therefore, the present disclosure is not intended to be restricted to specific features of the exemplary embodiments.

In other words, it is understood that the foregoing description is that of the exemplary embodiments of the disclosure and that various changes and modifications may be made thereto without departing from the spirit and scope of the disclosure as defined in the appended claims.

LIST OF REFERENCE NUMERALS

2 Surgical microscope
3 Operating field
4 Objective
7 Divergent beam
9 Beam
9A, 9B Stereoscopic partial beam path
11 Magnification changer
13A, 13B Interface arrangement
15A, 15B Beam splitter prism
19 Camera adapter
21 Camera
23 Image sensor
27 Binocular tube
29A, 29B Tube objective
31A, 31B Intermediate image plane
33A, 33B Prism
35A, 35B Eyepiece lens
37 Display
38A, 38B Spectral filter
39 Optical unit
40 Illumination apparatus
41 White light source
43 Deflection mirror
45 Illumination optical unit
47 Spectral filter
49 Neutral density filter
50 Varifocal objective
51 Positive member
52 Negative member
53 Displacement path
61A, 61B Image sensors
63A, 63B Displays
65A, 65B Eyepiece lenses
67A, 67B Cable
69 Navigation system
70 Observation object
72 Calculation unit
73 Time-of-flight camera
74 Illumination light cone
76 Marker
77 Infrared transmitter
78 Infrared receiver
79 Computer
80 Shading correction device
82 Monitor
84 Virtual plane
S1 Ascertaining the topography
S3 Capturing position and orientation
S4 Ascertaining the intensity distribution
S7 Recording an image
S9 Correcting the image
S91 Inverting the intensity distribution
S93 Normalizing the inverted intensity distribution S95 Projecting the normalized inverted intensity distribution on the topography
S97 Calculating correction factors
S99 Calculating the illumination intensity
S101 Correcting the image on the basis of the correction factors

What is claimed is:

1. A method for correcting a shading in a digital image of a three-dimensional observation object obtained by at least one image sensor of an optical observation device, the three-dimensional observation object being illuminated by illumination light having an intensity distribution, and an inhomogeneity in an image brightness being present in the digital image of the three-dimensional observation object, the method comprising:
   ascertaining a topography of the three-dimensional observation object;
   correcting the inhomogeneity in the image brightness of the digital image based on the topography of the three-dimensional observation object and the intensity distribution of the illumination light;
   forming an inverse of the intensity distribution of the illumination light within a virtual plane, a position and an orientation of the virtual plane relative to the three-dimensional observation object being known;
   calculating correction factors based on a projection of the inverse of the intensity distribution, formed within the virtual plane, on the topography of the three-dimensional observation object;
   normalizing the inverse of the intensity distribution within the virtual plane prior to the projection on the topography of the three-dimensional observation object; and
   normalizing the inverse of the intensity distribution within the virtual plane prior to the projection on the topography of the three-dimensional observation object such that the intensity distribution within the virtual plane has a value of "1" in a center of a light spot formed by an illumination within the virtual plane, and
   wherein the correcting of the inhomogeneity in the image brightness of the digital image includes ascertaining correction factors for a brightness of pixels or for the brightness of pixel groups in the digital image.

2. The method as claimed in claim 1, wherein the inhomogeneity in the image brightness is caused in part by a predetermined inhomogeneous intensity profile of the intensity distribution of the illumination light.

3. The method as claimed in claim 1, further comprising:
   ascertaining the intensity distribution of the illumination light within the virtual plane by a calibration measurement.

4. The method as claimed in claim 1, further comprising:
   calculating the intensity distribution of the illumination light within the virtual plane by taking account of an emission characteristic of a light source emitting the illumination light and the position and optionally the orientation of the light source emitting the illumination light relative to the virtual plane.

5. The method as claimed in claim 4, further comprising:
   calculating the intensity distribution of the illumination light within the virtual plane based on at least one of a plurality of setting parameters of an illumination apparatus including an illumination light source, the plurality of setting parameters including:
   a first setting parameter of a zoom setting of the illumination apparatus,
   a second setting parameter of a focal distance of the illumination apparatus, and
   a third setting parameter of a stop setting of the illumination apparatus.

6. The method as claimed in claim 1, further comprising:
   embodying the optical observation device to record stereoscopic images and ascertaining the topography of the three-dimensional observation object based on the stereoscopic images; or
   ascertaining the topography of the three-dimensional observation object based on a stereoscopic image of the three-dimensional observation object recorded by a time-of-flight camera system; or
   ascertaining the topography of the three-dimensional observation object based on a structured illumination and a distortion of a structure of an illumination in the stereoscopic image of the three-dimensional observation object recorded with the structured illumination; or
   ascertained the topography of the three-dimensional observation object with a laser scanner system.

7. The method as claimed in claim 6, wherein:
   the optical observation device includes an illumination device to perform the structured illumination of the three-dimensional observation object, and the method further comprises:
   ascertaining the topography of the three-dimensional observation object based on the distortion of the structure of the illumination in the digital image of the three-dimensional observation object recorded with the structured illumination, and
   implementing the structured illumination of the three-dimensional observation object in a wavelength range outside a visible wavelength range of light.

8. The method as claimed in claim 1, wherein the topography of the three-dimensional observation object, a spatial position and an orientation of the at least one image sensor and a position and the orientation of a virtual plane and, optionally, the position of a light source are specified in the same coordinate system.

9. The method as claimed in claim 8, wherein the topography of the three-dimensional observation object and the spatial position and the orientation of the at least one image sensor and, optionally, the position and the orientation of the virtual plane and, optionally, the position of the light source are ascertained with a navigation system.

10. An optical observation system, comprising:
   an optical observation device including at least one image sensor to record digital images of a three-dimensional observation object;
   an illumination device to illuminate the three-dimensional observation object with illumination light having an intensity distribution;
   a topography ascertainment device to ascertain a topography of the three-dimensional observation object; and
   a shading correction device connected to the at least one image sensor to receive a digital image of the three-dimensional observation object and connected to the topography ascertainment device to receive the topography and configured to:
   correct an inhomogeneity in an image brightness of the digital image of the three-dimensional observation object based on the topography and the intensity distribution,
   form an inverse of the intensity distribution of the illumination light within a virtual plane, a position and an orientation of the virtual plane relative to the three-dimensional observation object being known;

calculate correction factors based on a projection of the inverse of the intensity distribution, formed within the virtual plane, on the topography of the three-dimensional observation object;

normalize the inverse of the intensity distribution within the virtual plane prior to the projection on the topography of the three-dimensional observation object; and normalize the inverse of the intensity distribution within the virtual plane prior to the projection on the topography of the three-dimensional observation object such that the intensity distribution within the virtual plane has a value of "1" in a center of a light spot formed by an illumination within the virtual plane, and wherein the correcting of the inhomogeneity in the image brightness of the digital image includes ascertaining correction factors for a brightness of pixels or for the brightness of pixel groups in the digital image.

11. The optical observation system as claimed in claim 10, wherein the illumination apparatus facilitates an illumination of the three-dimensional observation object with a predetermined inhomogeneous intensity profile of the intensity distribution, which at least in part causes the inhomogeneity in the image brightness.

12. The optical observation system as claimed in claim 10, wherein the shading correction device is configured to ascertain correction factors for a brightness of pixels or for the brightness of pixel groups in the digital image of the three-dimensional observation object.

13. The optical observation system as claimed in claim 10, wherein the topography ascertainment device comprises:

a recording device to record stereoscopic images and a calculation device to calculate the topography of the three-dimensional observation object based on the stereoscopic images; or a time-of-flight camera system and the calculation device to calculate the topography of the three-dimensional observation object based on the digital image of the three-dimensional observation object recorded with the time-of-flight camera system; or an illumination apparatus for structured illumination of the three-dimensional observation object, the recording device to record the digital image of the three-dimensional observation object illuminated by the structured illumination and the calculation device to calculate the topography of the three-dimensional observation object based on a distortion of a structure of an illumination in the digital image of the three-dimensional observation object illuminated by the structured illumination; or a laser scanner system.

* * * * *